(No Model.)
Z. S. BURRELL, G. W. DE VOR & J. J. PENNAL.
HOISTING NET.
No. 363,113. Patented May 17, 1887.
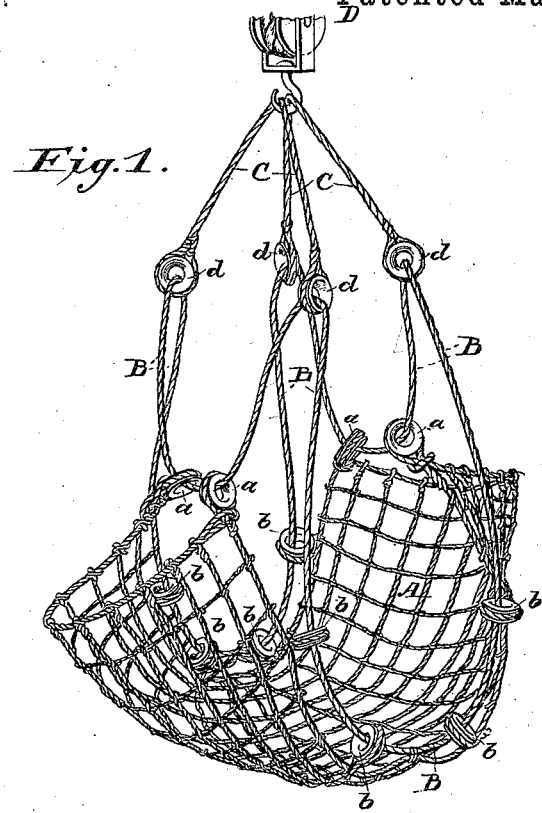
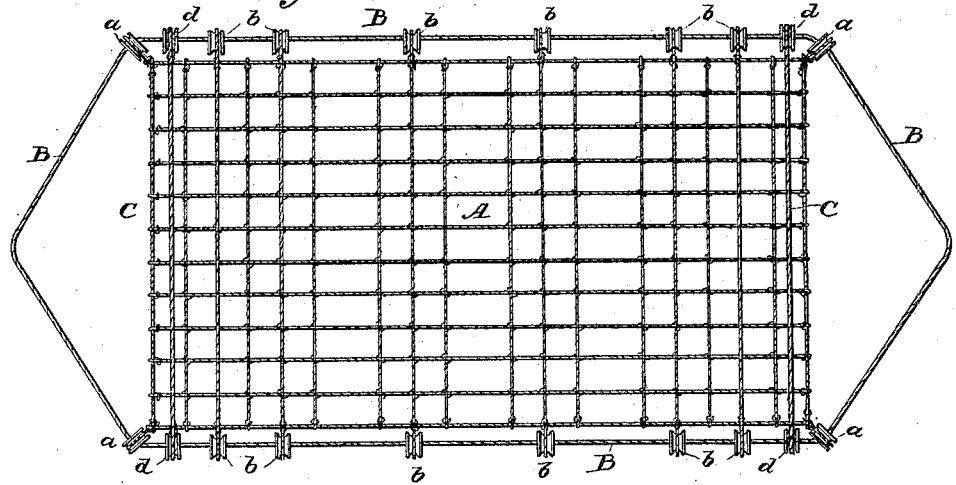
WITNESSES:
George Binkenburg
C. Sedgwick
INVENTOR:
Z. S. Burrell
G. W. De Vor
J. J. Pennal
BY Munn & Co.
ATTORNEYS.

UNITED STATES PATENT OFFICE.

ZEANAS SMITH BURRELL AND GEORGE W. DE VOR, OF BROOKLYN, NEW YORK, AND JOHN J. PENNAL, OF JERSEY CITY, NEW JERSEY.

HOISTING-NET.

SPECIFICATION forming part of Letters Patent No. 363,113, dated May 17, 1887.

Application filed December 3, 1886. Serial No. 220,575. (No model.)

*To all whom it may concern:*

Be it known that we, ZEANAS SMITH BURRELL and GEORGE W. DE VOR, of Brooklyn, in the county of Kings and State of New York, and JOHN J. PENNAL, of Jersey City, in the county of Hudson and State of New Jersey, have invented a new and Improved Hoisting-Net, of which the following is a full, clear, and exact description.

Our invention relates to hoisting-nets such as are used principally in loading and unloading small freight to and from vessels; and the invention consists, principally, in providing the net with a surrounding-cable united at or near the ends of the net by bridle-pieces, which are designed to connect with the hook of the hoisting-block, so that the strain upon the net will be equally distributed and the edges of the net gathered together to prevent the escape of any part of its load.

The invention also consists of the special construction of the net, all as hereinafter described and claimed.

Reference is to be had to the accompanying drawings, forming a part of this specification, in which similar letters of reference indicate corresponding parts in both the figures.

Figure 1 is a perspective of the net attached to the hook of the hoisting-block, and Fig. 2 is a plan view of the net spread out flat.

The body A of the net is made of strands of rope of suitable size woven together. At the corners of the body A are attached the runners $a$, and at suitable distances apart along the side edges of the body are attached the runners $b$ $b$, through which and the corner runners, $a$, the surrounding cable B passes loosely. Upon the cable B, next to the corner runner, $a$, between them and the adjacent runners $b$, are placed the runners $d$, to which are connected the cross or bridle pieces C, which are for attaching the net to the hoisting-block D, as shown in Fig. 1. The net being loaded and the bridle-pieces connected to the hoisting-block and elevated, the bridle-pieces will festoon the cable B and gather it and the edges of the net around the load, so that none of it can fall out of the net, and the strain upon the net will equalize itself to all parts of the net and to all parts of the cable B, so that the net as a whole is very strong and durable.

Having thus described our invention, what we claim as new, and desire to secure by Letters Patent, is—

As a new and improved article of manufacture, a hoisting-net composed of the body A, provided at its side edges with the runners $b$ and at each corner with a runner, $a$, and near each corner with a runner, $d$, in combination with the cord B, made endless and passed through all of the runners, and the cross or bridle pieces C, attached to the runners $d$, substantially as described.

ZEANAS SMITH BURRELL.
        GEO. W. DE VOR.
        JOHN J. PENNAL.

Witnesses:
  C. SEDGWICK,
  JAS. M. HENLEY.